United States Patent [19]
Dixon et al.

[11] 3,785,394

[45] Jan. 15, 1974

[54] WATER CONTROL VALVE STRUCTURE

[75] Inventors: Farris E. Dixon, Louisville, Ky.;
Sherwood L. Young, Monson, Mass.

[73] Assignee: American Standard Inc., New York, N.Y.

[22] Filed: July 12, 1972

[21] Appl. No.: 270,897

[52] U.S. Cl.................. 137/218, 137/436, 251/121
[51] Int. Cl............................................ F16k 45/04
[58] Field of Search.................... 137/218, 434, 435, 137/436, 437, 439, 441, 442, 444, 451; 251/120, 121, 122

[56] References Cited
UNITED STATES PATENTS

| | | | |
|---|---|---|---|
| 2,209,473 | 7/1940 | Price et al. | 137/217 |
| 3,070,118 | 12/1962 | Antunez | 137/436 |
| 926,968 | 7/1909 | Stickdorn | 137/218 |
| 2,259,984 | 10/1941 | Anderson | 137/218 |
| 2,814,304 | 11/1957 | Sloan | 137/218 |
| 3,559,673 | 2/1971 | Perlman | 137/218 |

*Primary Examiner*—Alan Cohan
*Assistant Examiner*—Gerald A. Michalsky

[57] ABSTRACT

Covers a water control valve for the water tank of a toilet bowl in which the valve structure is constructed for better and more positive anti-siphonic action. The valve structure includes a plunger which is coupled by a lever arm to a float so that the plunger may move vertically within a chamber having a tapered wall in response to changes in the level of water in the tank. The chamber has an opening at the bottom for a valve seat which may be sealed by an elastomer affixed to the base of the plunger when the plunger reaches its lowermost position to close the valve. Near its upper end, the plunger has a collar for loosely supporting two elastomer disks of considerable elasticity to seal the upper end of the chamber for the anti-siphonic action. An additional flexible elastomer element is positioned on another collar of the plunger and is spaced from the tapered wall of the chamber throughout the stroke of the plunger in either direction. The anti-siphonic disks are located within a housing having a cap with a plurality of holes therein through which air may be admitted, and the cap is also provided with an overhanging canopy which blocks the admission of foreign matter to the chamber while permitting air to enter the chamber. The cap is joined to a body member to complete the housing, the body member providing the chamber in which the plunger is freely movable.

9 Claims, 11 Drawing Figures

WATER CONTROL VALVE STRUCTURE

This invention relates to water control valves for the control of the flow of water through the water tanks associated with toilet bowls and relates especially to improved anti-siphonic mechanism for such valves.

One of the principal objects of this invention is to achieve a substantially complete water control valve with improved anti-siphonic action.

Another of the principal objects of this invention is to achieve a water control valve which will be of good construction, efficient in its operation, low in cost, simple in its installation, and easy for the average unskilled person, even the housewife, to make whatever repairs may be required to maintain the water control valve mechanism and keep it in good operating condition for years.

The usual or conventional water control valve now in use for the control of the flushing operation of the conventional toilet bowl is little different from its predecessor of many years ago. It includes a housing formed of parts which are connected to each other by a number of screws which are inserted into threaded holes tapped into the housing. It generally includes a ball type of float which is located within the water tank and rises or descends with the water level in the tank. The float is connected by a metallic rod to a valve mechanism so as to control the water level within the tank. By depressing a lever on the front wall of the water tank, a flush valve mounted at the base of the tank will be opened to release the water previously accumulated in the tank into the toilet bowl so as to cleanse the bowl. Soon after the water has been discharged from the tank, the water control valve will respond to the descent of the ball float and operate the water control valve so as to open the valve and allow a new supply of water to enter the tank so that it may be re-filled. After the re-filling operation has taken place and has brought the water level within the tank to a predetermined height, the ball float will be in its most elevated position, whereupon the water control valve will be closed to shut off any further flow of water into the tank. This operating procedure may be repeated from time to time as required merely by manipulating the exterior hand-controlled lever.

A form of water control valve presently available on the market is manufactured under an Antunez Pat. No. 3,070,118, issued Dec. 25, 1962, and it is an improvement over an earlier Owens Pat. No. 2,635,622, issued Apr. 21, 1953. Both patents show the housing composed of parts which are joined to each other by screw-threaded members. The earlier Pat. No. 2,635,622 discloses a valve which employs three contiguous disks of different diameters, all slidably mounted on the valve stem for anti-siphonic action so that none of the disks are retained by any groove of the valve stem. The outermost disks are made of resilient material but the intermediate disk is made of brass and is, therefore, metallic and lacks the flexibility required for good anti-siphonic action. An auxiliary disk may be employed. Its upward movement is limited by a projecting flange, while its downward movement is limited by an annular flange. This arrangement allows incoming water to flow upwardly in an annular upwardly diverging cone between the rim of the auxiliary disk and the inner flared wall of the chamber and impinge against and raise the anti-siphonic disks. The auxiliary disk, however, contacts one of the other of the flanges and these flanges definitely interfere with the valving function and improper operation necessarily results. The anti-siphonic disks are located within a chamber having openings at the top through which air may be received, but the openings are always uncovered and hence foreign matter may be easily admitted therethrough. Such foreign matter often interferes with the operation of the valve structure as well as with the anti-siphonic action.

This invention and its further objects and features will be better and more clearly understood from the more detailed description and explanation hereinafter following when read in connection with the accompanying drawing in which.

Like parts will be designated by like reference characters wherever they may occur throughout the drawing.

Figure 1:
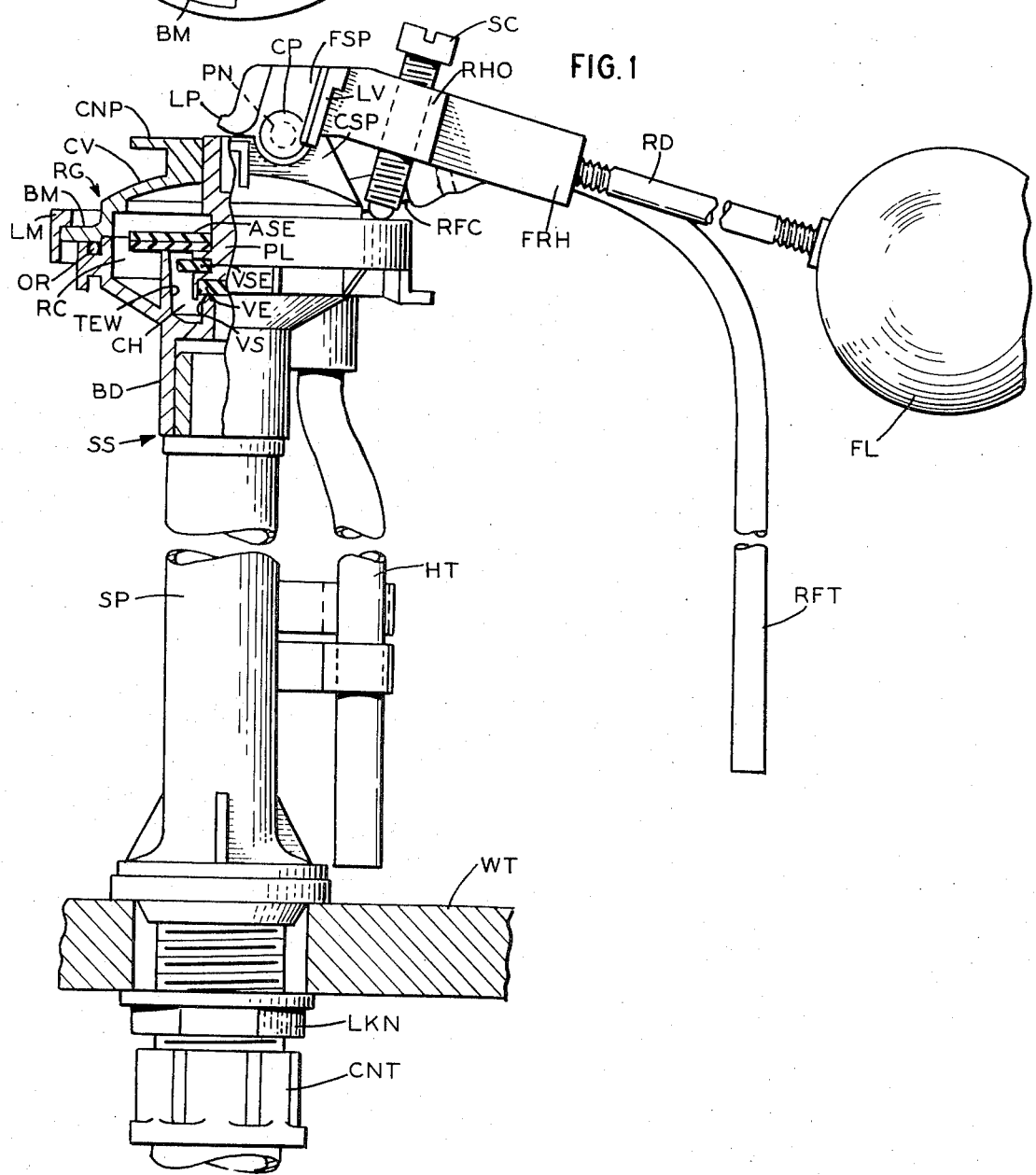
FIG. 1 illustrates an elevational view, partly in cross-section, of the water control valve employing structure conforming to this invention.

Referring to FIGS. 1, 2, 3 and 4 of the drawing and especially to FIG. 1 of the drawing, there is shown a standpipe structure SS embodying a water inlet standpipe SP which is threaded at its lower end so that it may be connected through the base of water tank WT to the city or local water supply by means of a lock nut LKN and a coupling nut CNT. The standpipe SP is to be coupled to a float FL which may be any conventional ball-type float adaptable for resting on the surface of the water within the tank WT and which is expected generally to follow, and respond to, the change in the water level within the tank WT. As is well understood, when the conventional hand lever (not shown), positioned on the outside of tank WT, is depressed to discharge the water previously accumulated within the tank WT, the flush valve (not shown) located at the base of the tank WT, which may be, for example of the type shown and described in Hurko et al., Pat. No. 2,772,268, issued Dec. 11, 1956, to which reference is herein made as part of this disclosure, is opened and the water within the tank WT is released through the flush valve to discharge the water within tank WT to the toilet bowl (not shown) to eliminate its contents. The float FL will then be promptly lowered to about its lowermost position and a new supply of water will then be allowed to enter the tank WT through standpipe SP to refill the tank. The incoming water supplied through standpipe SP will thereafter be shut off, as will be explained.

Figure 4:
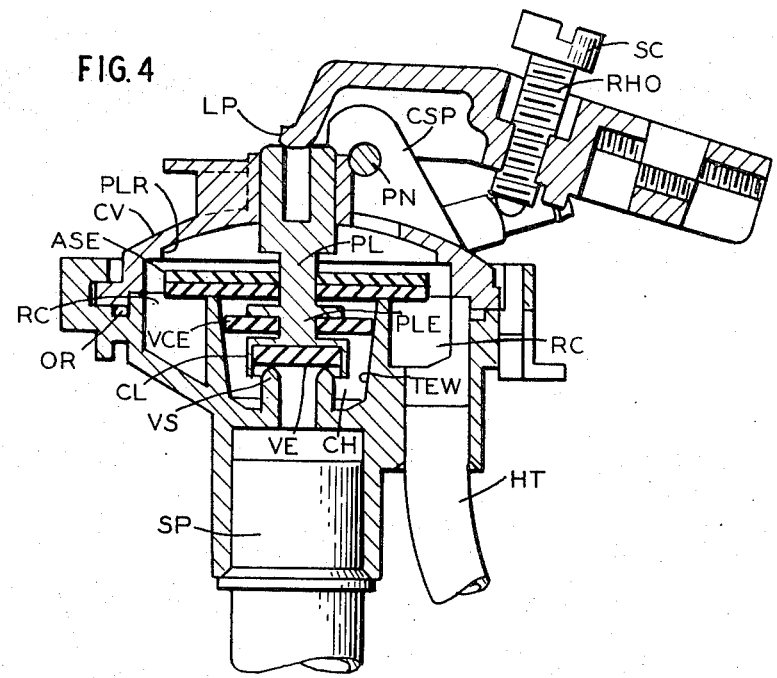
FIG. 4 shows a corresponding cross-sectional view of the same valve structure in its closed position.
Figure 3:
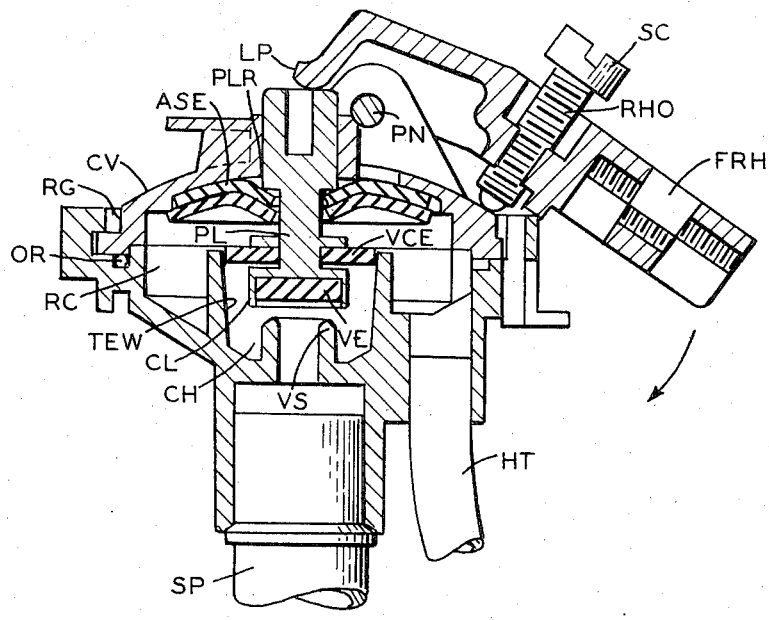
FIG. 3 shows a cross-sectional view of the valve structure in its open position.

As is better shown by FIGS. 3 and 4, a vertically movable plunger PL of special construction has permanently affixed to its base a flat circular rubber element VE or other elastomer element. The vertical movement of the plunger PL will be controlled to regulate the inflow of water to and the outflow of water from tank WT. The elastomer element VE will normally rest on a valve seat VS of cylindrical shape. The elastomer valve element VE may be glued or otherwise permanently retained within a collar CL of plunger PL. The valve seat VS is tapered and somewhat rounded at its upper end, as shown in FIG. 1, 3 and 4, to adequately receive the valve element VE so as to seal the valve seat VS (see FIG. 4) when the valve is to be closed. No water may then enter the tank WT from standpipe SP whenever the valve element VE is seated against the valve seat VS, as shown in FIGS. 1 and 4.

The standpipe SP has, or may be considered to have, a superimposed chamber CH having an upwardly and outwardly tapered valve extension wall TEW which is coaxial with the valve seat VS and within which a larger circular elastomer valve element VCE is positioned. The element VCE is mounted on a necked portion PLE of the plunger PL in a predetermined location immediately above the collar CL of plunger PL so that the element VCE will be loosely carried by plunger PL and moved by plunger PL upwardly or downwardly. The elastomer element VCE serves to improve the closure characteristic of the valve element VE against its valve seat VS at about the point in time when the water level within the tank WT returns to its assigned upper level, as will be further explained hereinafter.

Two additional elastomer elements, together designated anti-siphon elements ASE, are positioned about and loosely mounted on another necked portion PLE of plunger PL. These two elastomer elements ASE serve to seal the upper rim of the tapered extension wall TEW in the event that anti-siphon action is required, as will be later explained, to prevent the backflow of water from tank WT into the standpipe SP and thereby prevent the contamination of the city or local water supply.

Coaxial with the tapered extension wall TEW, there is a circular raceway and water channel RC which receives water upon the upward movement of plunger PL to raise the valve element VE above the valve seat VS, as may be seen more clearly in FIG. 3. The entering water passes over the rim of the valve seat VS, rises within chamber CH and then passes also over the rim of the tapered wall extension TEW and flows into and along the raceway RC. Most of the entering water then travels through the hush tube HT into tank WT (see FIG. 1) for filling the tank to prepare it for subsequent usage.

Figure 2:
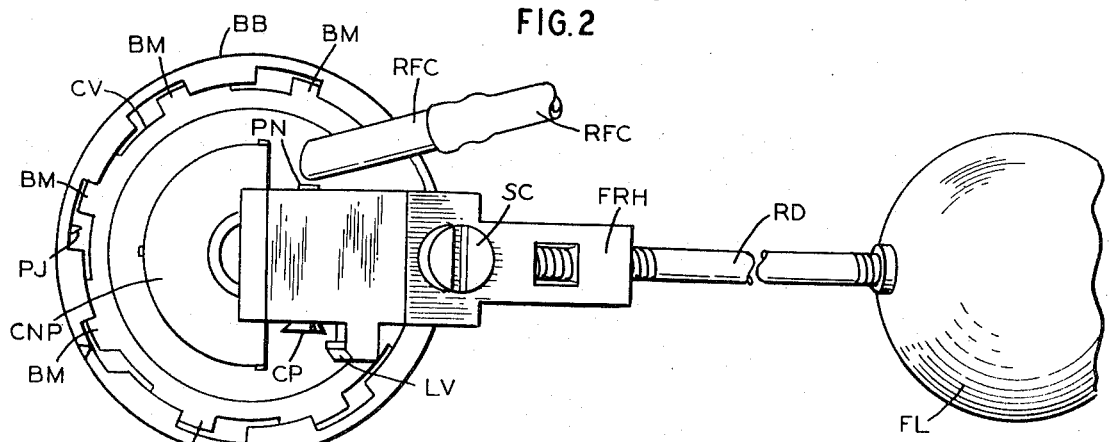
FIG. 2 shows a top plan view of the apparatus of FIG. 1.

As shown in FIGS. 1 and 2, the ball float FL is attached to the float rod holder FRH by means of a long slender cylindrical rod RD which is threaded at both ends, as shown in FIGS. 1 and 2, for easy attachment to the correspondingly threaded segments of float FL of the rod FRH. The float rod holder FRH just referred to has two parallel apertured supports FSP which are alignable with two corresponding parallel apertured supports CSP on the cap or cover CV. A long slender cylindrical pin PN is insertable through all of the apertures of both pairs of supports FSP and CSP to couple these supports to each other to render holder FRH rotatable about pin PN as an axis. The pin PN has a cap CP which is positioned under and retained by lever LV when the pin PN is inserted through the several apertures of the supports FSP and CSP and holds the pin PN in place to interconnect and couple the cover CV and rod holder structure FRH. By manually deflecting the lever LV, the pin PN may be released whenever desired and then removed from the several apertures to uncouple the rod holder FRH from the cover CV.

The rod holder FRH has a threaded opening RHO through which a set screw SC may be inserted to limit the downward angular rotation of the rod holder FRH about the axis formed by pin PN. This set screw SC fixes and limits the downward or clockwise angular rotation of the rod RD and the float FL in response to the opening of the flush valve at the base of water tank WT after the water within tank WT has been discharged.

The cap or cover CV also embodies a protruding conduit RFC as part of cap CV (see FIG. 2, for example) to which a rubber or plastic refill tube RFT may be affixed. The free end of the refill tube RFT is insertable into the usual overflow pipe (not shown) within the tank WT to feed water to the bowl to replenish the water in the conventional bowl trap after the flushing cycle has been completed and water has been supplied to the tank WT.

The cover or cap CP is shown, in one form, in FIGS. 5, 6, 7 and 11. The plan and bottom views (FIGS. 5 and 7, respectively) show a plurality of peripherally arranged protruding bayonet members, eight in number for illustration, each designated BM and all peripherally spaced from each other about the center of the cap CV. The valve body BD, one form of which is shown on FIG. 8, 9 and 10, contains a corresponding plurality of members LM for receiving and latching the protruding or bayonet members BM of cap CV so as to firmly connect the body member BD to the cap member CV. The peripheral spaces between the latching members LM of the body BD are sufficient to receive the corresponding bayonet members BM of the cover CV.

The several members LM of the body BD are intended to receive and hold the corresponding number of protruding bayonet members BM positioned on the internal wall of cap CV whenever the cap CV is to be attached to the standpipe structure SS. The cap CV may be attached to the body member BD and to the standpipe structure SS merely by inserting the bayonet members BM "within" and against the several latching members LM and then manually twisting the cover member CV about its axis through a very small arc of perhaps 7½° to establish a good firm physical connection between the two structures. The cap CV will remain attached to the body until the cover is physically twisted through a corresponding angle in the opposite direction. The cap member CV and the body member BD have an O-ring OR interposed between them (see FIGS. 1, 3 and 4) to seal these members against leakage.

When the flush valve of the water tank WT is opened by manipulating the hand-controlled lever on the outer wall of the tank to initiate the discharge of the water previously accumulated within the tank WT, the discharged water will necessarily lower the water level within tank WT, whereupon the float FL and the rod RD will both be correspondingly lowered by their clockwise rotation about the axial pin PN. As shown by FIG. 3, the holding force provided by the lip LP on the rod holder FRH will then be released, thereby allowing plunger PL to rise above the valve seat VS in response to the upward pressure of water then flowing upwardly through the standpipe SP and through valve seat VS and against valve element VE. The incoming water flowing in the space then opened up between the valve element VE at the bottom of plunger PL and the valve seat VS will travel upward through tapered chamber CH and over its upper rim into the raceway RC and then through hush tube HT into the water tank WT. The volume flow rate will increase rather rapidly as the plunger PL ascends.

Upon the closure of the flush valve at the base of tank WT after the tank WT has been substantially emptied, water will continue to flow at a rather rapid rate over the path previously described in connection with FIG. 3 to refill the tank WT. Hence, the level of the water will rise at a good rate within tank WT, thereby correspondingly elevating the float FL and its rod RD which together act as a lever controlling the vertical movement of plunger PL. Consequently, the plunger PL will descend to correspond generally with the upward movement of float FL.

The general operation of the valve mechanism is described in some detail in a copending application of Barry S. Fichter, Ser. No. 270,896, filed of even date and assigned to the same assignee to which reference is made and hence the description need not be further detailed here in order to avoid unnecessary repetition.

The standpipe structure SS as well as the cover structure CV, the plunger PL, the pin PN, the rod holder FRH, body BD and screw SC, are each separately formed as a single or unitary component and each is made of uniform solid plastic material, such as "ABS" plastic material. Each of these components is strong at all normally anticipated forces and pressures. The standpipe structure SS, the body member BD and the cover CV can be joined together or disconnected at any time merely by partially rotating the cap or cover mechanism CV over a small angle about the common axis of the body member BD. Such a small number of components indeed diminishes the number of steps required in the manufacture and assembly of the water control apparatus. Consequently the cost of manufacture, assembly and installation of the apparatus is quite low.

Substantially foolproof anti-siphonic structure is embodied in the valve mechanism of the present invention. As will be observed from the underside of the exemplary cap CV (see FIG. 7), there are six trapezoidal openings TRO and a substantially rectangular opening RO, all of which are employed for the easy admission of air to the upper side of the anti-siphonic elements ASE which, as already noted, may comprise two rubber-like, freely flexible or elastic elements loosely mounted on a neck of plunger PL (see FIG. 1). Furthermore, the cover CV embodies an overhanging protective canopy CNP (see FIG. 11) which is surmounted above all of the trapezoidal openings TRO. The canopy CNP prevents foreign matter from being dropped into the trapezoidal openings TRO. Hence the openings TRO will remain free and clear at all times. When freed of foreign matter, the multiple openings TRO in canopy CNP definitely prevent the establishment of suction in the region above the anti-siphon elements ASE.

The float rod holder FRH has, in cross-section, an inverted U shape, and two apertured supports FSP project downward from the legs of the U-shaped holder. The supports FSP are positioned outside the parallel apertured supports CSP on the cap CV. The rectangular opening RO is situated in cap CV between supports CSP and hence the opening RO is also covered and protected from foreign matter by the holder FRH. Thus, all openings within the upper surface of the cap CV are protected against the entrance of foreign matter into the valve chamber CH.

The anti-siphonic arrangement is intended to prevent contamination of the city or local water supply, as already noted, by blocking the flow of water, which was previously collected within tank WT and which may be nonpalatable or contaminated, from the water tank WT into the standpipe SP in response to a substantially droppage in pressure within standpipe SP. The contaminated water cannot then flow into and mix with the city or local water supply. The contamination of the water would occur, for example, in response to an abnormal pressure demand developed by a fire hydrant or by a pump drawing water from the city or the local supply. The anti-siphonic protective action will take place whether the plunger PL is in its closed position or in its open position or in any intermediate position. Whenever an abnormal demand for water should be developed, as may occur suddenly and in an emergency situation, the suction pressure developed in the standpipe SP will immediately attract the anti-siphon elements ASE and deflect these elements so as to seal the upper rim of the tapered wall TEW. The closure of the upper rim of the tapered wall TEW by the flexible anti-siphonic element ASE will occur promptly and unfailingly if the openings TRO and the opening RO are all held unimpeded in accordance with this structure. By sealing the upper rim of the wall TEW, it will be impossible for any of the water accumulated in the tank WT to be siphoned back into the standpipe SP and then into the city or local water supply.

Should the anti-siphonic elements ASE fail to seal the tapered wall TEW due to imperfections in elements ASE or due to foreign materials becoming lodged or collected between elements ASE and the tapered wall TEW, then apertures TRO and RO will freely admit air into the cavity of body BD to prevent a vacuum from forming within chamber CH and drawing water through hush tube HT or refill tube RFT into the supply pipe SP and then into the local water supply system.

When water is flowing through the valve mechanism, the anti-siphonic elements ASE are pushed by the oncoming water against the upper inner surface of cap CV (see FIG. 3) so that their outer edges will seal against the underside of the cap CV and thereby block the emission of water through the openings TRO and RO. Water pressure supplied through standpipe SP also firmly presses the flexible members ASE against the shoulder PLR of plunger PL, thus sealing the inner edge of members ASE. The anti-siphon members ASE thus form a coating for the upper part of the body cavity and prevent water from leaking out through apertures RO and TRO. This prevents leakage around plunger PL.

Figure 11:
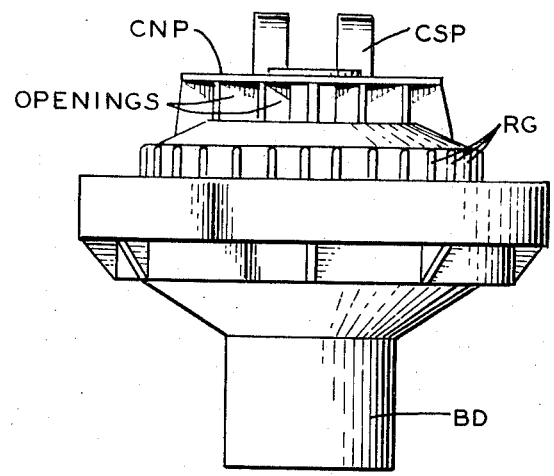
FIG. 11 shows certain features of the combination of the body section and the cap section of the structure of this invention.

The cap CV is formed so as to have a plurality of exterior radially extending ridges RG (see FIG. 11). These ridges may be gripped by hand whenever it is desired to join the cover CV to to the body BD and to the standpipe structure SS or whenever it is desired to break the union between the cover CV and these structures. The connection or disconnection requires only a small angular rotation, as already noted. No tools or instruments are required for these purposes.

The pin PN and the lever LV for connecting or disconnecting the float rod holder FRH and the cover CV are described and claimed in a co-pending application of S. L. Young, Ser. No. 223,271, filed Feb. 3, 1972.

Figure 5:
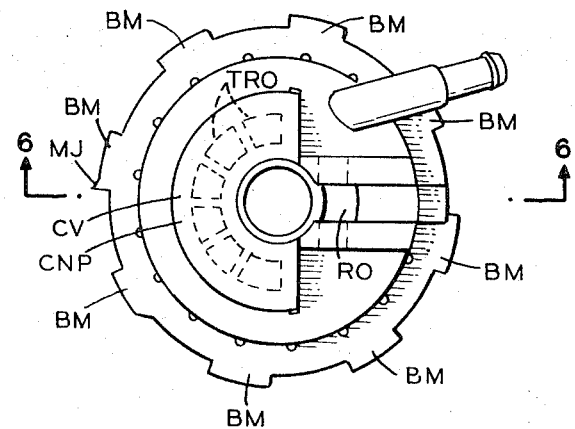
FIG. 5 shows a plan view of one form of cap for the chamber of the valve structure shown in this application.
Figure 6:
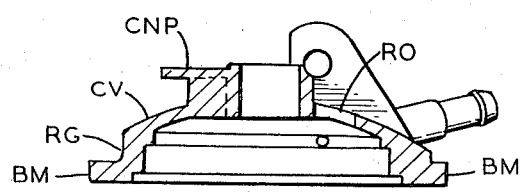
FIG. 6 illustrates a cross-sectional view of the cap taken along the lines 6—6 of FIG. 5.
Figure 7:
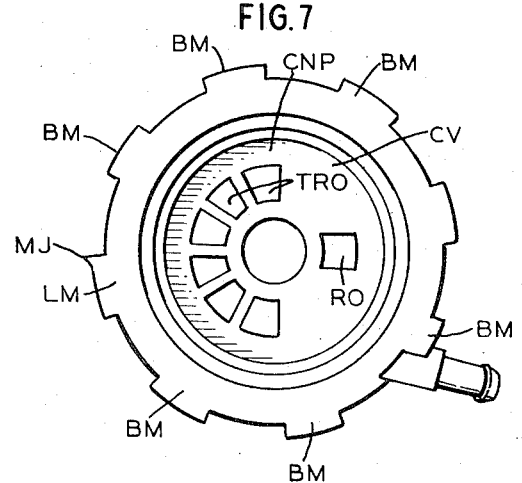
FIG. 7 illustrates a bottom plan view of the cover taken from the underside thereof.
Figure 8:
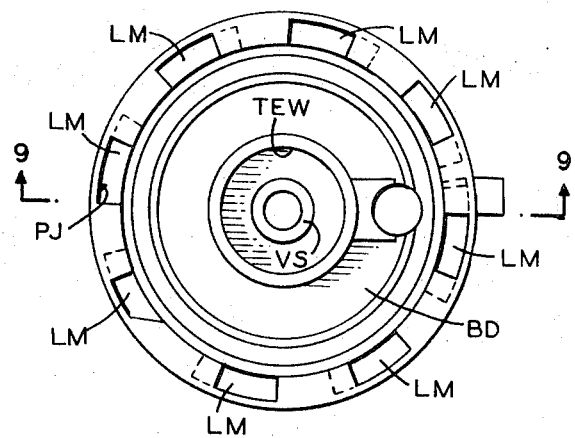
FIGS. 8, 9 and 10 illustrate views of the body of the chamber of the valve structure corresponding to the three respective views of the cover in FIGS. 5, 6 and 7.
Figure 9:
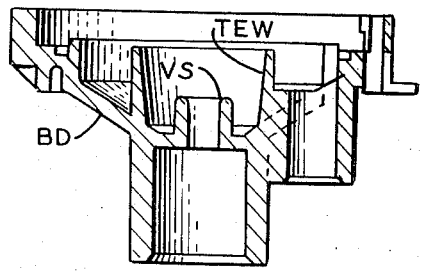
Figure 10:
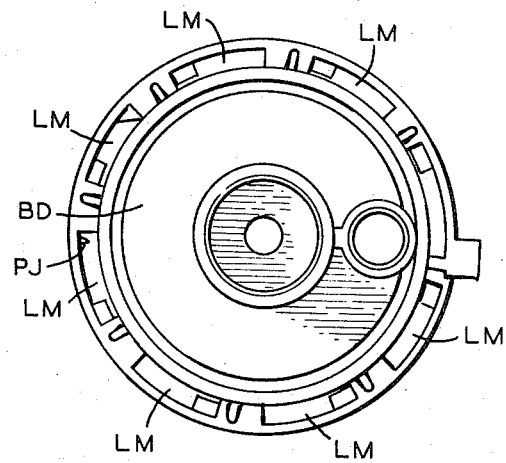

The cap member CV, shown in FIGS. 5, 6 and 7, and the body member BD, shown in FIGS. 8, 9 and 10, are to be joined together to enclose the valve seat VS and the plunger PL and to provide a flawless chamber for anti-siphonic protection of the city water supply, as already explained. The bayonet members BM of the cap member CV and the latching members LM of the body member BD will be interlocked whenever the two units are to be joined together. This is accomplished by interspersing the bayonet members BM with the corresponding latching members LM and twisting the cap member CV about the axis of the body member BD through a relatively small angle. To insure that these members remain interlocked, a projection PJ (see FIG. 8) is employed on the body member and a matching projection MJ (see FIGS. 5 and 7) is employed on the cap member CV to resist any initial movement of the cap member CV and the body member BD. These projections PJ and MJ interpose additional resistance to prevent the decoupling of the cap member CV from the body member BD except in the application of sufficient pressure on cap member CV and, likewise, when the two units are to be joined together, the latching members PJ and MJ will interpose a corresponding resistance which must be overcome before the bayonet members BM become interlocked with the latching members LM.

As shown in FIG. 11, the canopy CNP embodies a plurality of openings, designated "openings" in FIG. 11, which correspond to, and communicate with, the openings TRO in the cap CV, the latter openings TRO being shown, for example, in FIG. 7.

The openings TRO and RO in cap member CV are sealed when the valve is opened and thus prevent water leakage through those openings. But upon the advent of negative pressure at the pipe SP, the openings TRO and RO are cleared by the withdrawal of the flexible elements ASE, and this occurs whether the valve structure is in movement toward the open position or closed position or has actually reached the open or closed position. The canopy CNP supplies the overhead coverage for the openings TRO and RO to hold them available for the necessary openings and closings to provide protection against water leakage and anti-siphonage and contamination of the city water supply. The chamber CH is fully protected against these conditions at all times. It is important to have the elements ASE of sufficiently large diameter and of sufficient flexibility so that these elements may promptly respond to suction pressures in any and all positions of the plunger PL.

What is claimed is:

1. Anti-siphonic valve mechanism for the water tank of a toilet bowl, comprising, in addition to the water tank, an open-ended chamber having a water input opening at its lower end and a plunger which is movable axially within the chamber and includes mechanism having a flexible disk device above the open end of the chamber, the plunger being seated to close the water input opening of the chamber when the water in the tank reaches a predetermined upper level, a housing enclosing the chamber and the plunger and having a roof with substantially horizontal air openings therein to receive air into said housing and having a canopy integral with and overhanging said roof openings and also having additional communicating protective air openings therein beneath said canopy, each individually communicating with one of said roof openings, to allow air to flow through said additional air openings and through said roof openings into said housing, the flexible disk of the piston being lifted to close said roof openings when pressurized water enters the chamber through the water input opening but the peripheral region of the flexible disk is promptly turned down to seal the open-ended chamber when the fluid pressure within the chamber becomes negative to thereby prevent the reverse flow of water from the water tank to and through the chamber.

2. Anti-siphonic valve mechanism according to claim 1 including means responsive to the level of the water within the tank to control the movement of the plunger along the axis of the chamber.

3. A water control valve for the water tank of a toilet bowl, comprising, in addition to the water tank, an open-ended chamber having a circular cross-section positioned for admitting pressurized water at an inlet at the base of the chamber, a plunger movable along the axis of the chamber and seatable on said inlet to close the valve, means for moving the plunger upwardly along its axis to open said inlet when water is to be fed through said chamber and into said water tank, a plurality of flexible contiguous anti-siphon disks mounted on said plunger near the upper end thereof, a housing enclosing said valve and having at or near the upper end thereof a plurality of first openings through which air may be received, and a canopy surmounted integrally on said housing having protective second openings each individually communicating respectively with said first openings to permit air to enter said chamber through said first openings in the housing and through the second openings in said canopy but to block the droppage of foreign matter into said chamber, whereby the anti-siphon disks will seal the open end of said chamber in response to the application of negative pressure at the inlet of said chamber.

4. A water control valve according to claim 3 in which the anti-siphon disks have an area exceeding the area of the open end of the chamber and exceeding also the area embracing all of the first openings in the housing.

5. A water control valve according to claim 4, including means responsive to the droppage of the water level within the tank to a predetermined height to raise said plunger to allow water to enter said chamber via its inlet, and means responsive to a droppage of the pressure at said inlet to a predetermined value to move said anti-siphon disks down to the open end of the chamber to block the reverse flow of water from said tank into said inlet.

6. A water control valve according to clam 5, including a supplementary opening at or near the upper end of the housing, and means to block the droppage of foreign matter into said chamber through said supplementary opening.

7. A water control valve for the water tank of a toilet bowl comprising an open-ended chamber having a circular cross-section, a plunger movable along the axis of said chamber in one direction to open said valve to allow water to be supplied from an inlet to said valve and in the opposite direction to close said valve, a housing enclosing said chamber and said plunger, antisiphon protective apparatus for said valve, said apparatus including a plurality of first air openings in the roof, a canopy surmounted over the first air openings in the roof, said canopy having additional second air openings each individually communicating respectively with said first air openings through which air may be received into said housing, and a plurality of flexible contiguous disks mounted on said plunger above the open end of the chamber, said disks being movable in response to the opening of said valve to close all of the openings in the roof of said housing and being movable in response to the application of suction to said chamber to seal the open end of said chamber.

8. A water control valve according to claim 7 in which the flexible disks have an area which covers all of said first openings in the roof of the housing in the upper position of the plunger and covers the open end of the chamber in the lower position of the plunger.

9. A water control valve according to claim 8 in which the area of said flexible contiguous disks is so large that, in response to a negative pressure within the chamber, the peripheral regions of said disks will be promptly turned down to seal the open end of the chamber and prevent the reverse flow of water from said chamber back into the water supply inlet.

* * * * *